Aug. 19, 1969    E. S. EISENHARD    3,461,517
CASKET GASKET

Filed Dec. 27, 1966    3 Sheets-Sheet 1

INVENTOR.
ELI S. EISENHARD

BY

Paul + Paul
ATTORNEYS.

Aug. 19, 1969 E. S. EISENHARD 3,461,517
CASKET GASKET
Filed Dec. 27, 1966 3 Sheets-Sheet 3
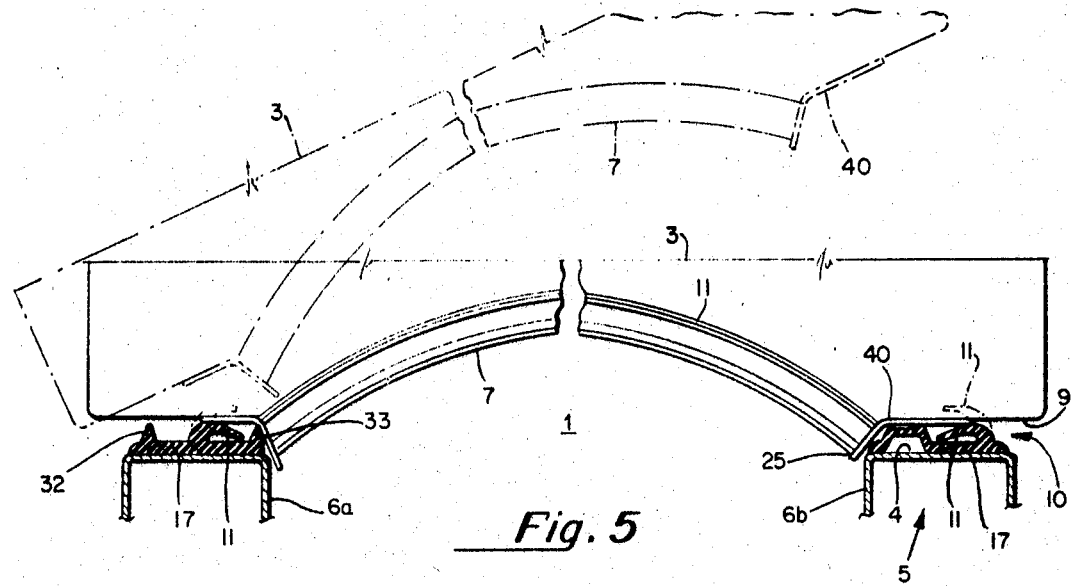
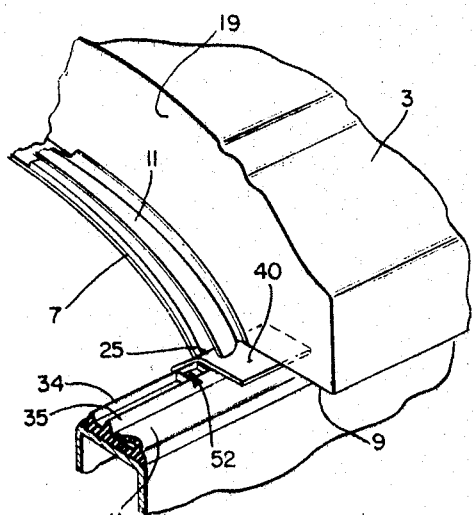
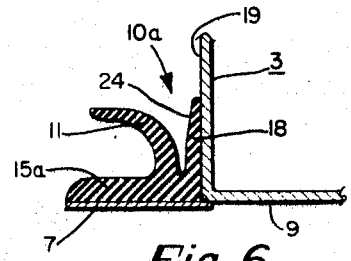
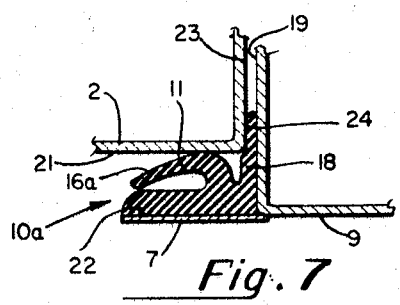
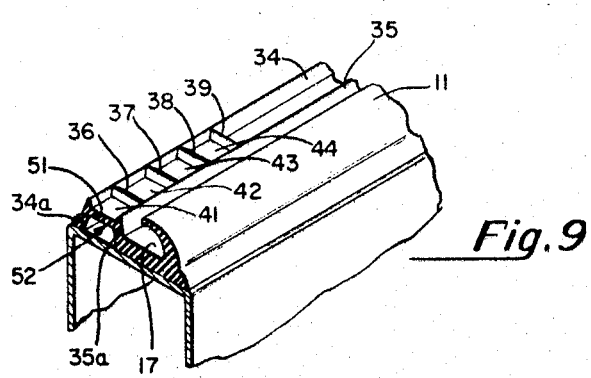
INVENTOR.
ELI S. EISENHARD
BY
Paul + Paul
ATTORNEYS United States Patent Office 3,461,517
Patented Aug. 19, 1969

3,461,517
CASKET GASKET
Eli S. Eisenhard, Boyertown, Pa., assignor to Boyertown Burial Casket Company, Boyertown, Pa., a corporation of Pennsylvania
Filed Dec. 27, 1966, Ser. No. 604,846
Int. Cl. A61g 17/02; E06b 7/16
U.S. Cl. 27—17                     1 Claim

ABSTRACT OF THE DISCLOSURE

A gasket for effecting a seal between the lid and base portion of a casket is in the shape of a single arc in transverse section arising from an extended base. This basic shape is modified for use in cut-lid caskets by the addition of an upwardly extending flange portion along one edge of the base facing the convex portion of the arc.

---

For a number of years attempts have been made through various means to hermetically seal burial caskets. The most difficult area to seal, of course, is the area between the lid of the casket and the base of the casket. Thus to prevent leakage into the casket, a sealing element must be disposed between the lid and the base of the casket, which sealing element should be continuous and encompass the periphery of the hollow portion of the casket base. It is also desirable, that the gasket be adaptable for various types of caskets, such as those with multiple or cut-lids on the top and those with rounded corners on the base.

In the prior art, attempts have been made to meet one or more of these design criteria with various types of gaskets having a variety of cross-sectional configurations. Initially these gaskets were formed of a solid material. More recently, hollow configurations have been developed. The solid configurations proved unsatisfactory because the material would tend to crush or split and did not easily conform to imperfections in the mating surfaces. The hollow configurations have been for the most part, elaborate and expensive to manufacture and install.

SUMMARY OF INVENTION

The present invention provides a simple and inexpensive means for achieving the aforementioned desirable results. It covers a sealing means for sealing a casket, said sealing means being disposed between the mating surfaces of the base of the casket and the lid of the casket, said sealing means comprising: a continuous gasket being generally arc shaped in transverse cross section and having a base portion mounted on one of said mating surfaces, said gasket being disposed to contact the remaining mating surface with the convex surface thereof, thereby forming a seal.

The arc shaped portion of the gasket is preferably flexible and formed of a resilient material.

In alternative embodiments of this invention, the arc shaped portion of the gasket is combined with an extended base portion having ribs in various configurations to provide additional sealing means and strengthening means.

Means are also provided to permit the gasket to be adapted to square as well as round cornered caskets, and to caskets having cut-lids.

Accordingly, an object of this invention is to provide a simple effective seal for hermetically sealing caskets.

Another object of this invention is to provide a simple effective seal for hermetically sealing caskets, wherein the seal is effected by a single flexible member which will easily adapt itself to imperfections and distortions in the mating portions of the casket.

Another object of this invention is to provide a simple and effective hermetic seal for a casket, wherein the seal will automatically adjust itself to compensate for variations in dimensional tolerances.

Another object of this invention is to provide a seal for hermetically sealing caskets which is easily adaptable for use with either square or round corner caskets.

Another object of this invention is to provide a seal for hermetically sealing caskets which is easily adaptable for use with single or cut-lid caskets.

These and other objects and advantages of the invention will become evident from the following description with reference to the accompanying drawings in which:

FIGURE 5 is a cross-sectional elevation taken along the line V—V in FIGURE 2 and showing the bottom portion of the lid in phantom alternate position and a portion of the gasket in phantom alternate position;

FIGURE 6 is a section taken along the line VI—VI of FIGURE 2;

FIGURE 7 is a section showing the change in the section shown in FIGURE 6, which results when the top portion of the lid is closed against the bottom portion of the lid;

FIGURE 8 is a view in perspective of a broken away portion of the right hand portion of the casket shown in FIGURE 5; and FIGURE 9 is a section in perspective of a portion of the gasket and casket shown in FIGURE 8, with the exception that the lid has been removed.

Figure 1:
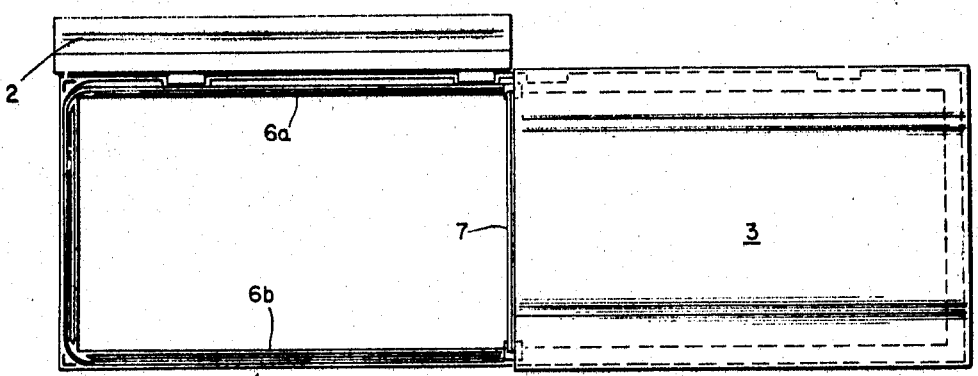
FIGURE 1 is a plan view of a cut-lid casket shown with the top portion of the lid opened and the bottom portion of the lid closed.

Referring to the drawings, FIGURE 1 shows a plan view of a casket, generally designated 1. The top portion 2 of the lid is shown in the raised position, and the bottom portion 3 of the lid is shown in the closed position. This is known as a cut-lid casket and is in as common use today as is the single lid type of casket. It will, of course, be understood that this invention is adaptable for use with either a cut-lid or a single lid casket. For example, in FIGURE 2, the portion of the casket 1 generally designated "A," could have been half of a single lid casket, wherein the other half would have been identical to it. In that case, the gasket, generally designated 10, would have been identical on both ends of the casket 1. However, the invention is shown and described with reference to a cut-lid casket, because this type of casket requires a more complicated gasket arrangement.

Figure 3:
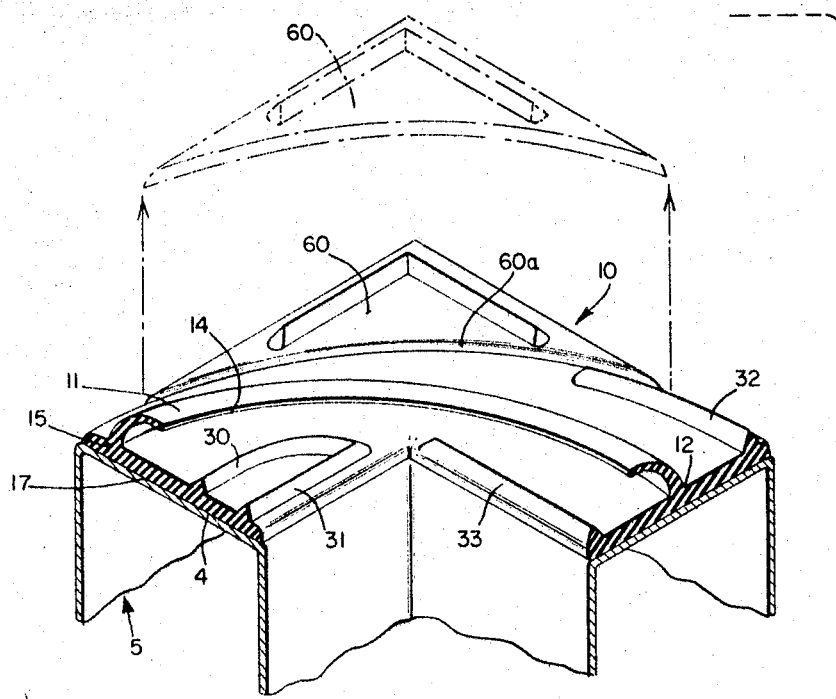
FIGURE 3 is a section in perspective taken along the line III—III in FIGURE 2 and showing a portion of the gasket in phantom alternate position.
Figure 4:
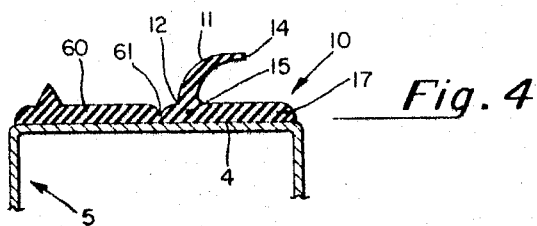
FIGURE 4 is a cross section taken along the line IV—IV in FIGURE 2.

The common elements of the gasket 10 are shown in FIGURES 3 and 4. The basic gasket 10 comprises a base portion 15 and a sealing portion 11. The base portion 15 is used to mount the gasket 10 to a surface of the casket 1. In the preferred embodiment of this invention, this surface is the flat upper surface 4 of the base 5 of the casket 1. A usual mounting means is adhesive; which serves not only to hold the gasket 10 in place on the surface 4, but also to seal the gasket 10 to the surface 4. The basic gasket 10 is continuous, in that it is disposed on the surface 4 so as to encompass the periphery of the hollow portion of the base of the casket, without interruption. The sealing portion 11 is generally arc shaped in transverse cross section. The base portion 15 is formed integrally with sealing portion 11 at the edge 12 (FIGURES 3 and 4), which is coincident with one end of the arc (when viewed in cross section) and which is somewhat thicker than the upper edge 14.

The arc shaped sealing member 11 is preferably flexible (as shown by FIGURES 5, 6, 7 and 8), and is usually formed of a resilient material. When depressed, as by the top portion 2 of the lid in FIGURE 7, the arc shaped sealing portion 11 deforms slightly so as to accommodate itself to the gap remaining between the plates 21 and 22. In so doing, the convex surface thereof abuts against the plate 21. The resilient material is to a certain extent flat at the point of abutment.

Another example of the flexing of the sealing portion 11, is shown in FIGURE 5. The bottom portion 3 of the lid is shown in phantom in the raised position. With the lid in this position the sealing portion 11 is disposed in its normal arc shaped condition. When the bottom portion 3 of the lid is closed upon the base 5 of the casket 1, the sealing member 11 is depressed by the force exerted upon its convex surface by the inner surface 9 of the lid. It is this coaction of the lid with the continuous gasket 10 mounted as previously described, that creates the hermetic seal for the casket 1.

Figure 2:
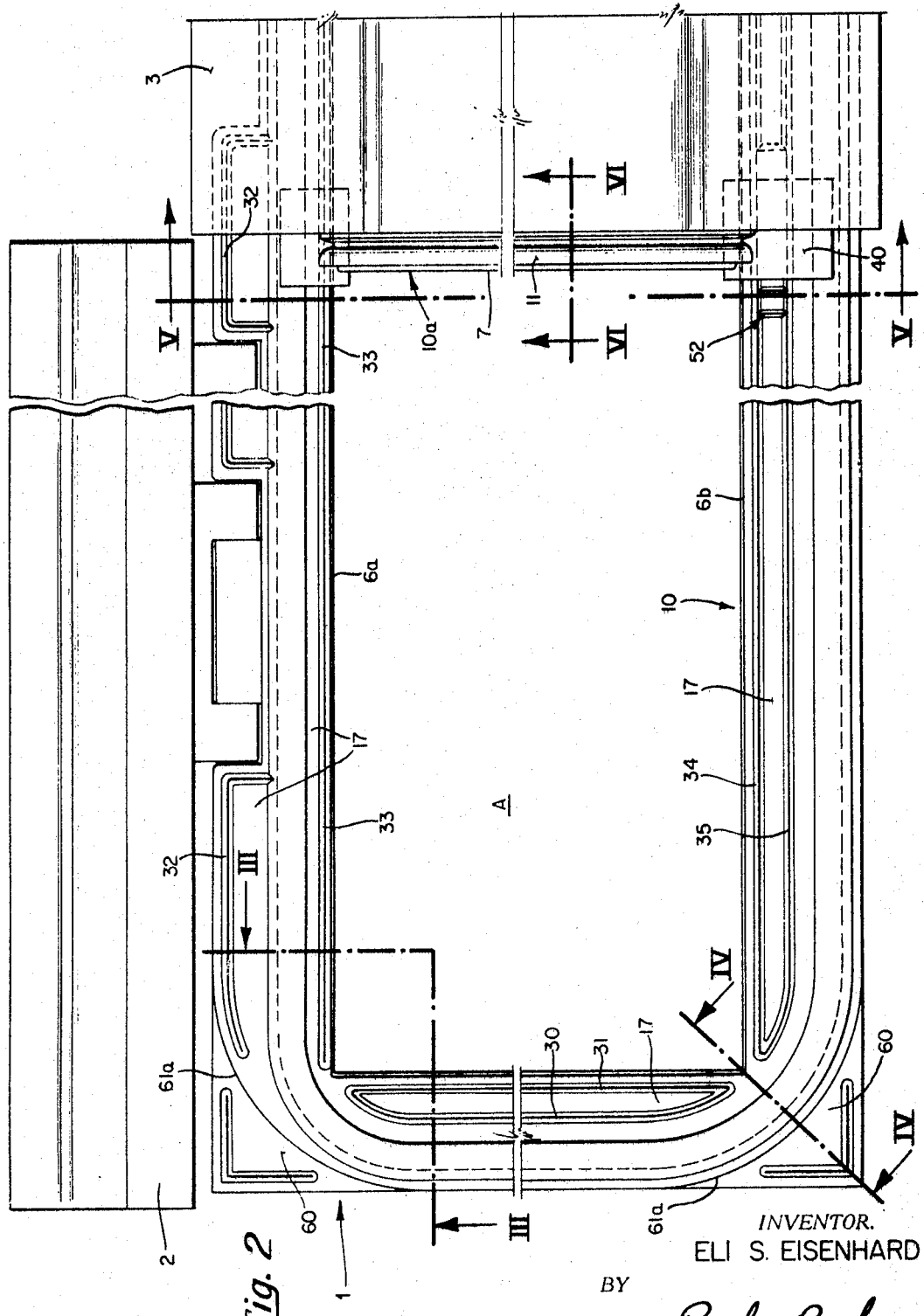
FIGURE 2 is a plan view, partially broken away, of a portion of the cut-lid casket with the cut-lid disposed as in FIGURE 1, showing the details of the gasket formed in accordance with the preferred embodiment of this invention.

The above described gasket 10 may be combined and integrally formed in various other configurations, so as to accommodate alternative casket designs. To this end, the basic gasket 10 is normally combined with an extended base member 17 having one or more raised ridges or ribs 30, 31, 32, 33, 34 and 35 thereon, as in FIGURE 2. These ribs, depending on their location and configuration, serve several functions. They act to reinforce the gasket 10 and prevent the gasket material from being crushed. Also, when the lid of the casket 1 is clamped shut, the ribs improve the sealing function of the gasket 10. One or more ribs may be arranged in a variety of ways. For instance, as shown in FIGURE 3, two ribs 30 and 31 may be placed on one side of the basic gasket 10 and substantially parallel to the sealing portion 11. Alternatively, a ribs may be placed on either side of the gasket 10 running substantially parallel to the sealing portion 11, as shown by ribs 32 and 33 (FIGURE 2).

When the gasket 10 is used in sealing a cut-lid casket, it can be adapted for sealing between the top portion 2 of the lid and the bottom portion 3 of the lid. The details of this construction are shown in FIGURES 5, 6 and 7. The construction shown in FIGURE 5 is typical of the domed construction used in cut-lid caskets. The flange 7 bridges the gap between the walls 6a and 6b of the casket 1. The bottom portion 3 of the lid supports the flange 7, which extends from the inner surface 9 thereof (FIGURE 6) and is rigidly connected thereto. This flange 7 supports the gasket, generally designated 10a. The base portion 15a of the gasket 10a is similar to that already described, and is permanently fixed to the flange 7, as by an adhesive. In addition to the base portion 15a, a side flange 18 is provided parallel to and in contact with the vertical edge 19 of the bottom portion 3 of the lid. The side flange 18 is permanently sealed to the vertical edge 19, by an adhesive. In cross section, the side flange 18 appears, as in FIGURE 6, to be slightly tapered. This tapering enhances the sealing characteristics of the gasket 10a. As will be apparent from FIGURE 7, not only is the arc shaped sealing portion 11 in sealed engagement with the plate 21 of the top portion 2 of the lid, but also the vertical edge 23 of the top portion 2 of the lid contacts the tapered surface 24 of the side flange 18 of the gasket 10a, when the top portion 2 of the lid is closed onto the bottom portion 3 of the lid.

The gasket 10a forms a seal in the region between the top portion 2 of the lid and the bottom portion 3 of the lid. Likewise, the gasket 10 forms a seal in the region between the entire cut-lid and the base 5 of the casket 1, as previously described. In order to maintain the continuity of the seal where the gasket 10a reaches the end 25 of the flange 7 (FIGURE 5), a separate sealing member 40, formed in the shape of bent plate, is disposed in permanent sealed engagement with the inner surface 9 of the bottom portion 3 of the lid and the end 25 of the flange 7. This sealing member 40 is also made of a resilient material, and may be held in sealed engagement with the inner surface 9 and the flange 7 by any suitable means, such as adhesive.

When the bottom portion 3 of the lid is moved from the open position shown in phantom FIGURE 5, to the closed position shown in FIGURE 5, the sealing member 40 will preserve the continuity of the seal, at the juncture between the end 25 of the flange 7 and the gasket 10 disposed on the upper surface 4 of the base 5.

Since the sealing member 40 forms a discontinuity along the inner contiguous surfaces of the top and bottom portions, 2 and 3 respectively, of the closed lid, which inner surfaces would otherwise be substantially continuous, the arc shaped sealing portion 11 of the gasket 10 must form itself around this discontinuity. It has been found that the addition of several ribs (34 and 35, FIGURES 8 and 9) enhances the sealing characteristics at this juncture. It has further been found that a special waffle-type construction further enhances the sealing characteristics at this juncture.

Referring to FIGURE 9, the details of this special waffle construction are shown. The waffle construction is disposed in the upper surface 51 of a hollow member 52 which, in cross section, is substantially trapezoidal, and which forms an integral portion of the extended base member 17. The waffle itself is formed between extensions 34a and 35a of the two parallel ribs 34 and 35 previously described, by means of cross ribs as at 36, 37, 38 and 39, thereby providing shallow areas as at 41, 42, 43 and 44. This type of construction provides additional strength, resiliency and flexibility, and therefore a more effective seal in the area of the sealing member 40.

It is typical in the industry to provide a variety of shapes in caskets, and in particular to provide some caskets with round corners and others with square corners. To this end, the gasket 10 may be adapted, as shown in FIGURES 2, 3 and 4. The gasket 10 has an extended base portion 60 formed integrally therewith and extending over the area of surface 4 which forms the corner of the base 5 of the casket 1. Note in FIGURE 4, that between the extended base portion 60 and the base portion 15 of the gasket 10, the resilient material forming the gasket 10 has been necked down in the form of a groove, thereby forming a thinner section of the gasket base, as at 61. This grooved portion at 61 shows in the plan view FIGURE 2, as the lines 61a. Forming these lines 61a along the contours of various casket corners, provides an easy means for adapting the gasket 10 from a square cornered gasket, to a gasket appropriately configured to fit a number of casket designs. Thus as seen in the phantom view in FIGURE 3, it is possible to easily remove the extended base portion 60, by simply cutting along the line 61a and removing that portion of gasket 10 which had been formed to one side of the line 61a.

Thus this type of gasket provides a simple and effective means for hermetically sealing a casket. The arc shaped sealing portion 11 has a wide range of possible shapes, and therefore, may be squeezed through a wide range of vertical dimensions, so as to easily accommodate changes in the gaps between mating surfaces due to tolerances and imperfections in the surface areas in contact with the gasket 10. Furthermore, the flexibility of the arc shape and the resiliency of the material, prevent the material from being crushed or permanently distorted. The gasket can be strengthened as needed with rib members and it can be adapted for use with cut-lid caskets, and with caskets having other than square corners.

It will be understood that various changes in the details, materials and arrangements of parts which have been herein described and illustrated in order to explain the nature of this invention may be made by those skilled in the art within the principle and scope of the invention as expressed in the following claims.

What is claimed is:

1. A gasket for use with a casket having at least two lid sections with adjacent end edges at least one of which has a flange extending therefrom along the inner edge, said gasket comprising: a base portion and a seal portion, said seal portion having an arc shaped cross-sectional configuration, and having one end thereof, coincident with one end of said arc, formed integrally with said base portion, said arc extending above said base portion, and having the other end thereof remote from said base portion, said seal portion being flexible; said base portion adapted to be mounted on said flange so that the convex portion of said arc will engage the underside of the adjacent lid section upon closing of the lid sections, said gasket having an upraised portion formed integrally with said base portion along one edge thereof adjacent the convex surface of said arc shaped portion, said upraised portion having a surface thereof tapered outwardly toward said base portion, said tapered surface being disposed to contact the edge of said adjacent lid section when said lid sections are closed.

References Cited

UNITED STATES PATENTS

| | | | |
|---|---|---|---|
| 2,753,613 | 7/1956 | Baker | 27—17 |
| 3,065,517 | 11/1962 | Dower | 27—17 |
| 3,327,429 | 6/1967 | Slaughter | 27—17 X |

WILLIAM E. KAMM, Primary Examiner

U.S. Cl. X.R.

49—485, 495, 496